United States Patent [19]

Higuchi et al.

[11] Patent Number: 4,880,142
[45] Date of Patent: Nov. 14, 1989

[54] POWDER WEIGHING MIXER AND METHOD THEREOF

[75] Inventors: Noboru Higuchi; Keizo Matsui; Chuzo Kobayashi; Hiroshi Ohnishi, all of Kanagawa, Japan

[73] Assignee: Fuji Photo Film Co., Ltd., Kanagawa, Japan

[21] Appl. No.: 188,343

[22] Filed: May 4, 1988

[30] Foreign Application Priority Data

| May 12, 1987 | [JP] | Japan | 62-113429 |
| May 14, 1987 | [JP] | Japan | 62-115892 |
| May 14, 1987 | [JP] | Japan | 62-115893 |

[51] Int. Cl.$^4$ ............................................. B67D 5/08
[52] U.S. Cl. .................................... 222/56; 222/63; 177/114; 177/116
[58] Field of Search .................. 222/56, 63, 55, 52; 177/114, 116, 64

[56] References Cited

U.S. PATENT DOCUMENTS

| Re. 32,101 | 4/1986 | Ricciardi et al. | 222/56 |
| 3,985,266 | 10/1976 | Wright, Jr. | 222/55 X |
| 4,619,336 | 10/1986 | Boyer et al. | 177/116 X |
| 4,630,755 | 12/1986 | Campbell | 177/64 X |
| 4,694,418 | 9/1987 | Ueno et al. | 364/807 |
| 4,762,252 | 8/1988 | Hyer et al. | 222/56 |
| 4,775,949 | 10/1988 | Kalata | 222/56 X |
| 4,777,585 | 10/1988 | Kokawa et al. | 364/164 X |

FOREIGN PATENT DOCUMENTS

| 151723 | 7/1987 | Japan | 177/116 |
| 642744 | 7/1981 | Switzerland | 177/64 |

Primary Examiner—Joseph J. Rolla
Assistant Examiner—Boris Milef
Attorney, Agent, or Firm—Sughrue, Mion, Zinn, Macpeak & Seas

[57] ABSTRACT

A powder measuring device and powder measuring mixer in which powder is supplied from a supply hopper to a measuring hopper with its flow rate controlled by a flow regulator associated with the hopper. The weight of the measuring hopper is monitored. A controller compares the measured weight with a target rate to produce a deviation therebetween and a time variation of the deviation. The controller operates according to fuzzy inference to produce a desired flow rate for the next control cycle. This desired flow rate is then supplied to the flow regulator. Several supply hoppers with associated flow regulators can be used. Then the output of the controller is switched between the different flow regulators at different phases of the mixing measurement. Additionally, the measuring hopper can be movable between the different supply hoppers so as to avoid complicated piping.

6 Claims, 12 Drawing Sheets

POWDER WEIGHING MIXER AND METHOD THEREOF

BACKGROUND OF THE INVENTION

1. Field Of the Invention

This invention relates to a powder weighing method, and more specifically it relates to a powder weighing method which makes possible high accuracy, wide-ranging and short-duration weighing by varying the speed of flow of the powder supply of a following cycle by means of a fuzzy inference performed on the basis of a weighing setting and the actual weighing value.

The present invention further relates to powder weighing mixers which produce new materials by mixing various kinds of powders after having weighed them.

2. Background Art

Conventionally, for weighing powders, there have been used scale systems which in the main make use of load cells.

There are known control systems which regulate the time taken and the flow rate in a following weighing cycle by calculating the average flow from the time taken and the overall discharge weight of a body being weighed in the prior prescribed count weighing cycles. These systems then find the deviation from the target weight based on this average flow amount have been disclosed in Japanese Patent (OPI) Publication Nos. 148019/81 and 155412/81. See also Japanese Patent (OPI) Publication No. 29114/82.

Thus, to date, there have been no closed loop weighing control methods which sequentially alter the speed of flow in accordance with the actual weighing value weighed in the receiving container.

Furthermore, when supplying powder from a plurality of supply containers (or tanks) to one receiving container in conventional powder weighing mixers, separate weighing equipment is attached to each of the supply containers.

For example, for heavy weighings two pieces of weighing equipment are used for two powders, as shown in FIG. 1. For closed loop control (one of the features of this invention) of these separate pieces of equipment, a two-loop control function is required for the pre-estimation control of the flow amount.

This is to say that it has not been possible to expect highly accurate weighings with a single control function because the powder flow varied as a result of the amount of powder remaining in the supply container, the target weight and the varying values of the physical properties of the powder.

Furthermore, there are weighing methods for realizing high accuracy weighing which change over to a slower speed of flow near the set target weight by providing equipment which possesses the capability of changing over to fixed conditions of differing speeds of flow as disclosed, for example, in Laid-open Japanese Patent Application (OPI) No. 72015/82. Alternatively, flow regulators of differing speeds of flow may be arranged in series. However, here too a two-loop control is required for the control function.

The reason for using the expression two-loop control function here is that when for example, dispersion-type control equipment is used, it is possible to compute the control functions with a single piece of control equipment so that two pieces of control equipment are, in fact, not required. However, it is still called two pieces of control equipment from the point of view of the software and the number of inputs and outputs.

Again, in connection with the above-mentioned methods, there are some methods which anticipate the amount of inflow to the weighing vessel at the cessation of weighing and stop the flow slightly in advance.

Because conventional weighing control methods have fixed weighing conditions within a prescribed range, either with a fixed speed of flow or dividing the speed of flow into two stages and changing over between them, as mentioned previously, they have the drawbacks mentioned below.

(1) Weighing accuracy: There are times when the accuracy cannot be guaranteed because of disturbances and changes in the physical properties of the powder.

Thus, the transfer equipment will differ with the physical properties of the powders. For example, dampers are used with granular powders because they have good flow characteristics and screw feeders are used with powders with poor flow characteristics. However, powder flow cannot be defined according to a single rule, and flow will vary with disturbances such as the consistency of the powder, the powder form and vibrations.

The flow characteristics of hygroscopic powders and powders which readily form bridges in particular will vary with their storage conditions. Thus, in a system in which powder is also stored over long periods in its supply vessels, the flow characteristics of a powder will change with changing environmental conditions, for example temperatures humidity and vibrations caused by the attachments such as vibrators, air knockers, etc., used to accelerate the flow characteristics of the powder. Thus, weighing accuracy declines with changes in the conditions of supply flow. There are, therefore, imposed limitations on the amounts stored and limitations on the installation conditions for the equipment with their resultant increase in the initial cost and running costs for component parts. These limitations are necessary to maintain weighing accuracy.

(2) The weighing range: The weighing range is narrow.

The reason for this is that there is an amount of residual inflow caused by delays in the response of the system even after the flow at one part of the system has been stopped. Since the amount is determined by the speed of flow, when the speed of flow is fixed, a tolerable amount of inflow can be guaranteed by narrowing the weighing range. Accordingly, even when weighing the same powder, if the weighing settings greatly diverge, weighing equipment suitable to each weighing range will be necessary and the number of units of equipment will increase.

(3) Weighing time: The weighing time is governed by the target weight.

The weighing time is short when the target weight is small and long when it is large. Weighing equipment with a weighing time appropriate to the production cycle is required in accordance with the target weight and the number of units of equipment is thus increased. Moreover, if target weights are to differ for each starting powder when several powders are to be mixed to produce a new mixed powder, for example, the production capacity of the system is determined by raw materials which require the longest duration weighings.

Furthermore, in conventional powder weighing mixers, many individually controlled units of weighing equipment are installed for each supply container for the above-mentioned reasons. Since they are installed for each optimal weighing time in order to increase the production capacity, the system is complicated and very many component parts are added to the weighing equipment.

Based on the above-mentioned facts, the present invention intends to provide a powder weighing mixer with the great economic advantages of:

(1) reducing the initial cost by reducing the number of units of equipment;

(2) reducing the labor spent on maintenance by similarly reducing the number of units of equipment;

(3) reducing breakdowns by improving reliability by reducing the number of units of equipment; and (4) reducing running costs as a result of reducing raw material losses.

The weighing control equipment should not only produce high accuracy weighing unaffected by changes in the flow speed caused by disturbances and variations in the physical characteristics of the powder, but should also guarantee a wide range of weighing. It should effect weighing in a short time ungoverned by the size of the target weight. Thus, a system can be constructed which increases production capacity and simplifies component parts while reducing source material losses.

SUMMARY OF THE INVENTION

Based on the above-mentioned considerations, this invention intends to provide a powder weighing method which effects high accuracy weighings unaffected by changes in the flow rate caused by disturbances and variations in the physical properties of the powder and which secures a wide-ranging weighing range, and moreover, which effects short duration weighings not governed by the size of the target weight.

The above-mentioned objects of this invention are further achieved by using powder weighing mixers which make use of weighing control equipment which makes the speed of flow variable from moment to moment by means of a closed loop control and a control based on fuzzy inference. Such mixing equipment can reduce the number of component parts in the aforementioned weighing control equipment.

The powder weighing mixer of this invention is constructed using the basic construction given below.

(1) Supply containers: containers which store the powder to be weighed.

The capacity of the container should be of a scale appropriate for production.

With this invention, there are no limitations on the amount of stock material remaining in the container. In theory, weighing may be carried out down to a zero remaining amount. Furthermore, any powder may be weighed down to an amount remaining of zero as long as the measuring is not affected by values of its physical properties (for example, grain size, etc.) and the powder is able to flow out.

(2) Flow regulator: the number of flow regulators correspond to the number of supply containers. These control the flow by, for example, instructing the rotation count in a screw feeder. In an aperture damper, the flow is varied by changing the aperture using a position command.

Furthermore, the flow characteristics of the screw feeder and the aperture damper are of a construction such that outflow does not occur when the rotation count rate and the aperture are slightly above zero and flow occurs from around 10% of maximum speed or opening.

As an example, AC servo motors, or the like, can be used as the drivers.

(3) Receiving containers: containers with a capacity appropriate for the scale of production.

(4) Detectors: positioned on the receiving containers, these weigh the amount of powder received into the receiving container. In the case of mixable powders, they are capable of cumulative weighing in one receiving container.

(5) Weighing control equipment: control equipment which operates with closed loop control and which changes the speed of flow. This control allows the speed of flow of powder in the flow regulator to vary using a control system using fuzzy inference. That is to say, the initial speed of powder transmission in the flow regulator is determined by the flow characteristics in the flow regulator and the weighing setting. Thereafter, the change in the transmission speed is determined by fuzzy control based on the actual weighing value and the weighing setting.

(6) Change-over equipment: changes over its input from the weighing control equipment to one of several outputs connected to a prescribed flow regulator.

(7) Moving equipment: moving equipment for conveying the receiving container. There are unmanned carriages and other conveyors which might be used as the method of conveying. Moreover, there will be occasions when the conveying function will be on the receptor container itself and occasions when it will be separate from the receiving container.

The basic elements of this invention are given above. The invention further requires the use of closed loop weighing control equipment which varies the flow speed. In addition, the weighing control equipment performs the control based on fuzzy inference.

The above-mentioned objects of this invention are achieved by means of a closed loop powder weighing method which varies the supply flow rate of powders by means of an arbitrarily set target setting and an actual weighing value when powders are supplied and weighed from a supply vessel to a receptor vessel. The speed of transfer is varied by performing a fuzzy inference using a target weight and the flow characteristic of a flow regulator which controls the speed of flow to determine the speed of transfer of the powder through the flow regulator prior to the beginning of weighing. Then, fuzzy control is carried out based on the target weight and the actual weighing value which is sequentially observed.

DETAILED DESCRIPTION OF THE PREFERRED EMBODIMENTS

An embodiment of the invention is described below with reference to the figures.

Figure 1:
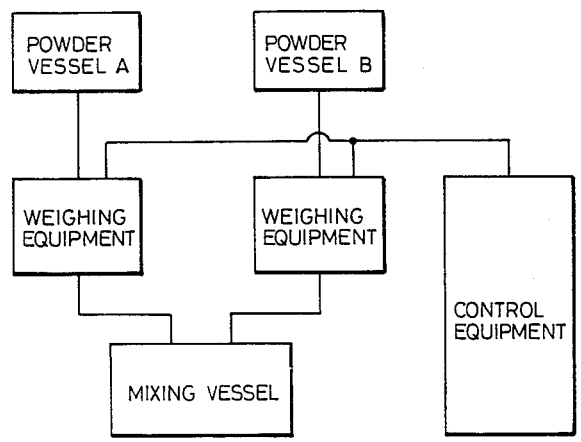
FIG. 1 is an illustration of a prior art measuring mixer.
Figure 2:
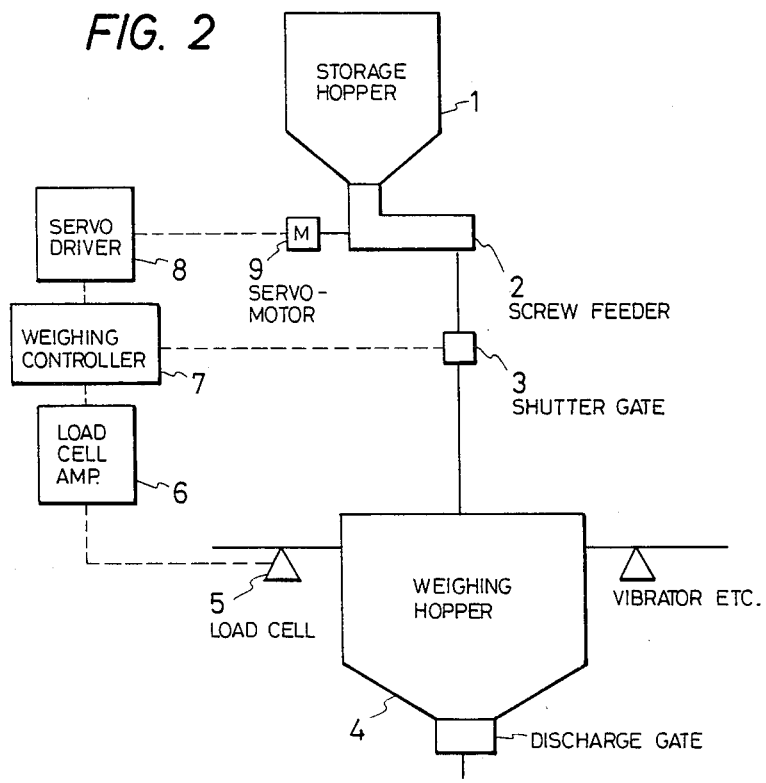
FIG. 2 is a figure illustrating powder weighing equipment which can be used in one embodiment of this invention.

FIG. 2 illustrates powder weighing equipment which can appropriately be used as one embodiment of this invention. This embodiment shows an addition weighing where weighing is carried out in a receiving vessel. The powder is transferred to the receiving vessel which is placed on the downstream end.

In the figure a storage hopper 1 acts as a supply vessel stocked with the powder to be weighed. A screw feeder 2 acts as a flow regulator which controls the speed of flow of the powder and is positioned at the outlet of the storage hopper 1. A shutter gate 3 can stop the flow. A weighing hopper 4 acts as a receiving vessel which has a weighing capability and is positioned on top of a load cell 5. A load cell amplifier 6 amplifies the output of the load cell 5. A weighing controller 7 controls the screw feeder 2 and the shutter gate 3. A servo driver 8 is controlled by the weighing controller 7 and in turn drives a servo motor 9 which drives the rotation of the screw feeder 2.

The screw feeder 2 is able to vary the amount of supply powder flow over a wide range by varying its speed of rotation.

Figure 3:
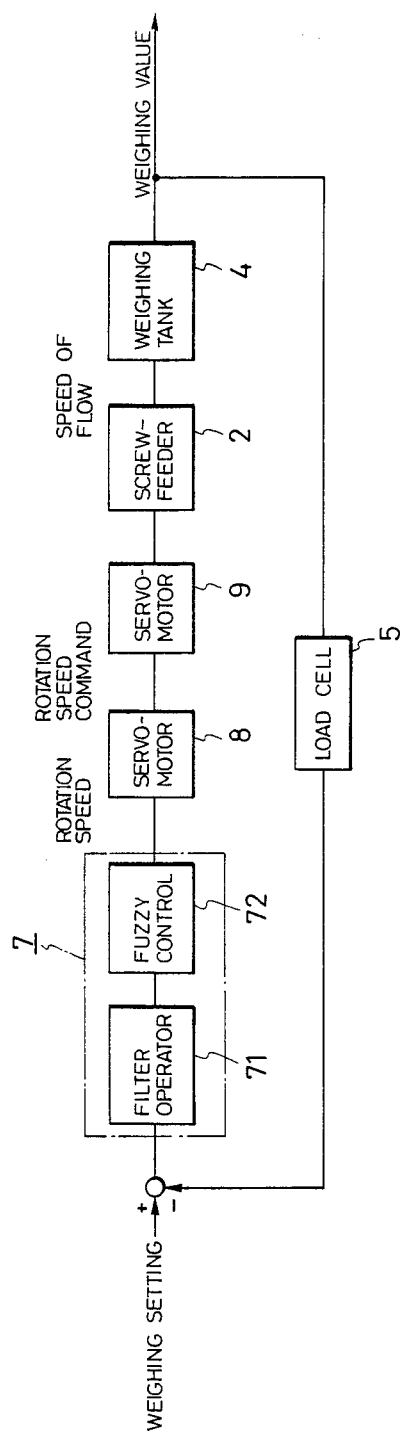
FIG. 3 is a block figure explaining the control process in the equipment of FIG. 2.

The powder weighing method of this invention is now explained making use of both FIG. 2 and the control block diagram of FIG. 3.

When a target weight of an arbitrary amount is entered in the weighing controller 7, the fuzzy control part 72 of the weighing controller 7 calculates the initial rotational speed of the screw feeder 2 using fuzzy inference from the flow characteristics of the screw feeder 2 which are known beforehand.

At the same time as the beginning of weighing, the weighing controller 7 opens the shutter gate 3 and controls the servo driver 8 in such a way that the servo motor 9 of the screw feeder 2 rotates at this initial rotational speed.

By this means, the powder is transferred from the storage hopper 1 to the weighing hopper 4 and the actual weight is measured using the weighing hopper 4. At this time, the weighing hopper 4 is being used to observe the actual weight which changes from moment to moment in a prescribed control cycle. The actual weight is weighed by the load cell 5 and is fed back to the weighing controller 7 via the load cell amplifier 6.

As well as calculating the deviation and the change in the deviation over time between the preset target weight setting and the actual fed back weight, a filter computing part 71 in the weighing controller 7 also performs a low pass filtering process on both these amounts.

The fuzzy control part 72 alters the speed of flow by performing a fuzzy inference based on this filtered observed amount and calculates the speed of rotation of the screw feeder 2 in the next control cycle.

Fuzzy inference will now be described. Fuzzy inference, used in a fuzzy control system, is intended to emulate control by a human operator. If the operator observes that the deviation between a target value and a measured value is large and a time rate variation of this deviation is small, then he would increase the flow rate which decreases the deviation more quickly. On the other hand, if he observes that the deviation is small but the time rate variation is somewhat large, then he would slightly decrease the flow rate. Fuzzy control is discussed by E. H. Mamdani in a technical article entitled "Application of Fuzzy Algorithms for Control of a Simple Dynamic Plant" appearing in the Proceedings of IEEE, vol. 121. 1974 at pages 1585-1588 and by L. A. Zadeh in a memorandum entitled "Theory of Fuzzy Sets". Memo No. ERL-M502. Electronic Research Lab., University of California, Berkeley (1975).

Figure 4:
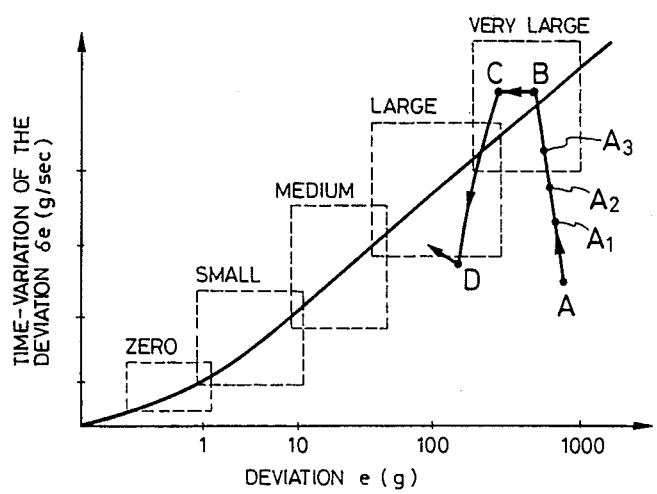

In FIG. 4 is plotted the deviation e (here the difference between the target weight and the actual measured weight) as a function of the time variation $\delta e$ (here the difference of the deviation e between the present and the past measuring cycles). If the measured deviation e and the measured time variation $\delta e$ fall within a balance zone, then the current flow rate is appropriate in view of the current deviation so that the valve opening or the like is not required to be changed. Rather than performing an exact arithmetic computation, however, the variables are designated by "vague" variables such as very small, small, medium, large and very large.

If the variables are designated by these vague variables and by membership functions and if a control method is defined by "if-then" rules, fuzzy measurement control becomes possible. A fuzzy rule is generally expressed in the form of: if e is A and $\delta e$ is B, then $\delta u$ is C. In the present invention, e is the deviation. $\delta e$ is the time variation of the deviation and $\delta u$ is the time variation (between control cycles) of a quantity controlling the flow, such as the amount of opening of the control valve. The variables A, B and C in the rules are likewise defined by the vague variables, very small, small, etc.

The membership functions are defined for each of the deviation e, the time variation of the deviation $\delta e$ and the time variation of the control quantity $\delta u$. Such a membership function for the deviation e (in units of grams) is plotted in FIG. 5. The vertical axis is the membership value, function varying between 0 and 1. If the measured deviation is 3, then the deviation at the current measuring cycle is determined to be "small". Similar membership functions must be created for $\delta e$ and $\delta u$.

The membership functions for the measured values (namely, the deviation e and the time variation of the deviation $\delta e$) should be divided along the measured value axis such that the intervals become increasingly smaller for smaller measured values. This variation is apparent from the semilog plot of e versus its membership function in FIG. 5 in which the control vague values have equal widths when expressed logarithmically.

This type of variation is required if improvements in weighing accuracy and short duration weighings are both desired. When the deviation is large, there is no need for fine controllability, while when the deviation is small, there is a need to improve the control accuracy. This same idea also applies to the low pass filter processing. When the deviation or similar quantity is small, the output of the low pass filtering of these quantities is used to improve the weighing accuracy by attenuating the short term movement of the weighing detector (load cell).

Figure 6:
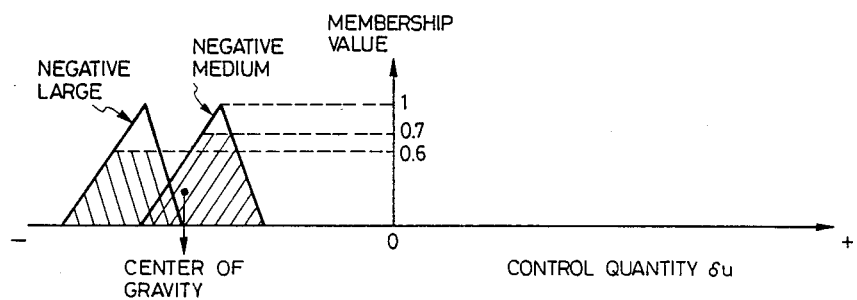

For fuzzy control, a number of fuzzy rules are defined beforehand. For example, a first rule is that if e is small and $\delta e$ is large, then $\delta u$ is negative large; and a second rule is that if e is small and $\delta e$ is medium, then $\delta u$ is negative medium. A further set of rules can be derived from FIG. 4, such as if e and $\delta e$ are small, then $\delta u$ is zero. Other rules become apparent from FIG. 4. When each of e and $\delta e$ falls in only one zone of the vague variables, then a single fuzzy rule using those vague variables is used to obtain the operation quantity $\delta u$. If, however, the observed quantity falls in two zones of vague variables, two fuzzy rules for the observed quantity must be used with the membership values acting as weights in combining the "then" values of the operation quantities $\delta u$. For instance. FIG. 6 is a diagram used for obtaining the control quantity $\delta u$. Providing that e has a membership value 0.8 in small zone, and $\delta e$ has a membership value 0.6 in large zone and value 0.7 in medium zone. Further, providing that fuzzy rules are (1) e is small and $\delta e$ is large, then $\delta u$ is negative large and (2) e is small and $\delta e$ is medium, then $\delta u$ is negative medium. In this case, a membership value of $\delta u$ is determined to be smaller one of values of e and $\delta e$ (other selection is possible). Accordingly, the membership value of $\delta u$ is 0.6 when rule (1) is used, and 0.7 when rule (2) is used. From the membership values, $\delta u$ is obtained by calculating, for example, the center of gravity of the area hatched in FIG. 6.

The initial setting of the flow is also performed with a form of fuzzy inference based upon the target weight and the flow rate characteristics of the flow regulator. Membership values and fuzzy inference rules need to be defined for the variables. One result is that the target weights have membership values in the range of zero to one which are formed in discrete steps and the flow regulator is controlled accordingly.

After the beginning of weighing, the screw feeder 2 is controlled in such a way that it assumes an appropriate rotational speed. The rotational speed gradually tends to slow with the gradual lessening in the weighing deviation and thus the flow rate decreases. When the weighing deviation falls below a certain value with the decrease of the weighing deviation and the time rate variation of the weighing deviation, the weighing stops so that the shutter gate 3 closes, the rotational count rate of the screw feeder 2 is set to zero and rotation ceases. At this time, the speed of flow is extremely small and the amount of residual inflow is thus, extremely small. As a result, the action of the screw feeder 2 changes in the weighing range due to the target weight and the processing system. Thus, the weighing range is increased and weighing is possible in a single piece of weighing equipment irrespective of the size of the target, although the static accuracy of the detector must be observed.

Moreover, the action of the shutter gate 3 varies even within the weighing time and weighing is possible in an almost equally short weighing time irrespective of the size of the target weight.

As has been described above, the weighing method of this invention controls the speed of flow as a result of fuzzy control of the rotation count rate of a screw feeder using closed loop control (FIG. 3) with a fixed control cycle based on the actual weight observed by the load cell 5.

In the above embodiment, a screw feeder was given as the flow regulator which can vary the speed of flow. However, the flow regulator may be a rotary system which is able to vary the flow by means of a rotation count command in the same way as the screw feeder. Furthermore, the drive equipment is not limited to servo motors but inverter motors may also be used and any equipment which can vary its rotational count or position is possible.

EXAMPLE

Test results based on this invention will now be explained.

These tests were performed on the weighing equipment shown in FIG. 2.

The weighing equipment which produced the results was capable of a maximum weighing of 5 kg. The accuracy of the load cell was 1/2500. The screw feeder had its rotational rate controlled by the inverter motor, a rotational count command (voltage output) being outputted from the weighing command equipment.

Figure 7:
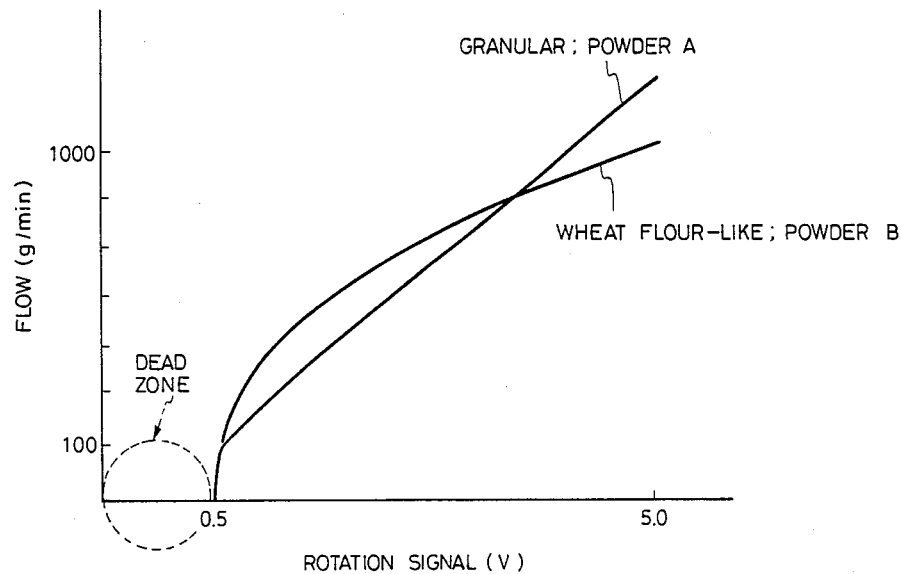
FIG. 7 is a plot of the flow characteristics for two kinds of powder through a screw feeder.

FIG. 7 shows the characteristics for the average value of flow rate as a function of the inverter input voltage (rotation signal) for two kinds of powders. These two kinds of powder had the following characteristics. Powder A was a granular powder with an apparent density of 0.5 and powder B was a wheatflour-like powder with strong adhesion and an apparent density of 0.5. These two kinds of powders were weighed using the system of FIG. 2 with no changes whatsoever being made to the respective control system and the like.

Figure 8:
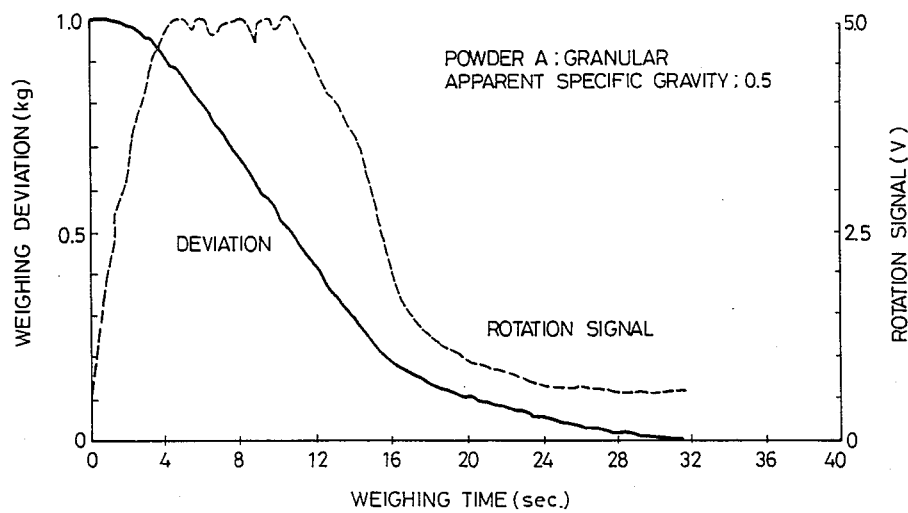
FIGS. 8 to 10 are figures of the weighing characteristics of example experiments based on this invention.
Figure 9:
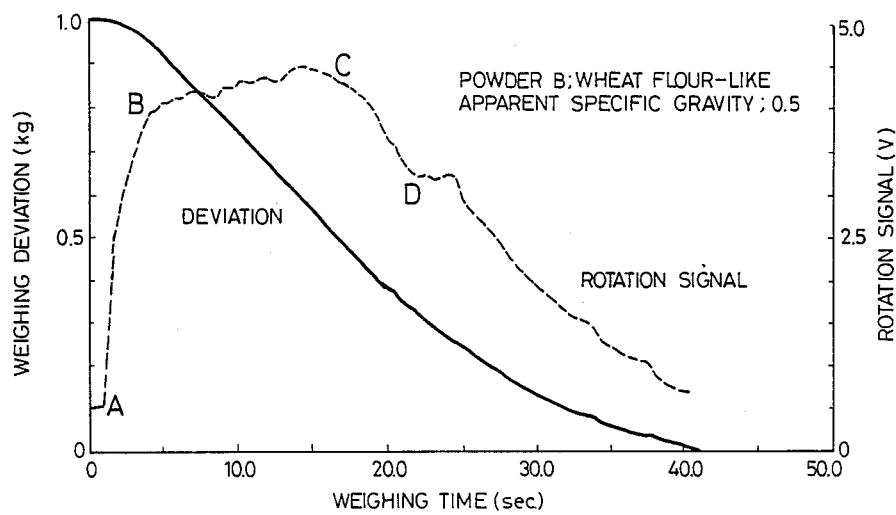

FIG. 8 shows the weighing results for 1 kg of powder A and FIG. 9 shows the weighing results for 1 kg of powder B. As FIGS. 8 and 9 make clear, it was possible to obtain highly accurate weighing results in about the same weighing time even though the action pattern for the rotation of the screw feeder varied.

Furthermore, the flow characteristics were different because of different flow properties, by making the storage hopper vibrate and by compressing the powders. However, although the action pattern of the screw feeder as a result varied, the same results were obtained for both the weighing time and the weighing accuracy.

A process used for obtaining the result of measurement shown in FIG. 9 will be described in more detail in terms of fuzzy control.

Figure 6A:
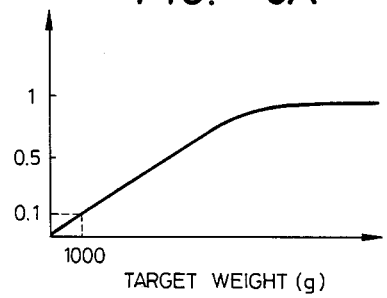

An initial rotation signal of the flow regulator is determined by a membership function as shown in FIG. 6A. For example, when the set value (target weight) is 1000 g, a membership value corresponding to the set value is 0.1 from FIG. 6A. The maximum rotation signal of the regulator is set at 5 v based on the flow-rate characteristics of the regulator, so that the initial rotation signal of the regulator is set at $5 \times 0.1 = 0.5$ v. The fuzzy control is not conducted for a while (wastful time). Since it takes a time to transfer the liquid from a supply tank (storage hopper) to a measurement tank (weighing hopper) as shown in FIG. 2, if the fuzzy control is conducted immediately after initiating the measurement, the rotation signal of the regulator may be increased excessively. Accordingly, the fuzzy control is not conducted for the wastful time, which is within 0–9.9 seconds.

In the measurement, fuzzy rules used are as follows:

(1) If e is very large and δe is medium, then δu is positive medium, (2) If e is very large and δe is large, then δu is positive small, (3) If e is very large and δe is very large, then δu is zero, (4) If e is large and δe is very large, then δu is negative small, (5) If e is medium and δe is very large, then δu is negative medium, (6) If e is medium and δe is large, then δu is negative small, (7) If e is large and δe is large, then δu is zero, (8) If e is large and δe is medium, then δu is positive small, and so on.

At point A in FIG. 9 or FIG. 4, fuzzy rule (1) is used so that δu is increased. At point $A_1$ in FIG. 4, fuzzy rules (1) and (2) are used so that the opening degree further increases. At point $A_2$ in FIG. 4, fuzzy rule (2) is used. At point $A_3$ in FIG. 4, fuzzy rules (2) and (3) are used. At point B in FIG. 9 or FIG. 4, fuzzy rule (3) is used so that the opening degree of the valve is not varied. At point C in FIG. 9 or 4, fuzzy rules (3) and (4) are used so that the rotation signal of the regulator is decreased. Between points C and D in FIG. 9 or 4, some fuzzy rules are used as between points A and B. At point D in FIG. 9 or 4, fuzzy rule (8) is used so that the rotation signal of the regulator is increased. In the similar way, the fuzzy control is conducted so that the result of measurement shown in FIG. 9 was obtained. In this experiment, powder was measured, which is apt to flow discontinuously, so that small fluctuations occurred between points B and C. A low pass filter may be used for e and δe to reduce the fluctuations.

Figure 10:
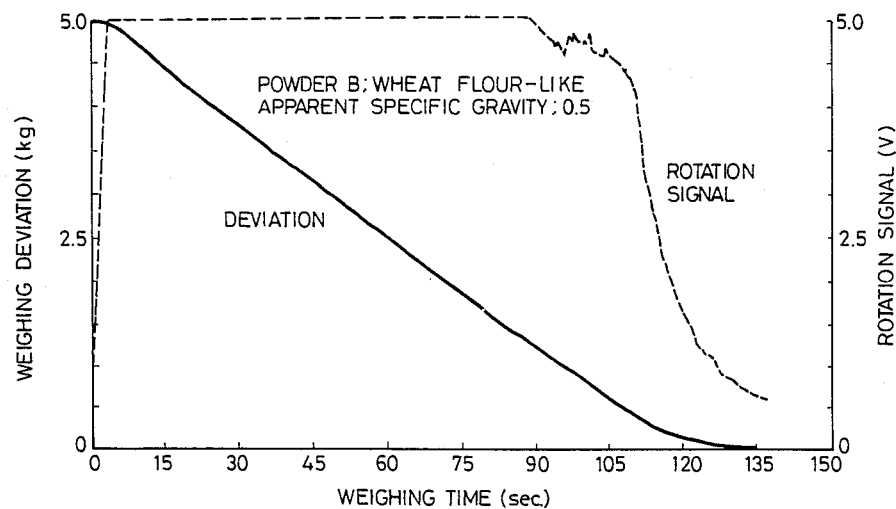

Table 1 shows the relationship between the weighing time and the weighing accuracy as a function of target weight. To obtain the weighing accuracy, the powder outflow was measured with a separate approved gravimeter. The 5 kg weighing was limited by the maximum rotational speed of the inverter motor used in this test and thus, the extended weighing time was extended. Nonetheless, the weighing accuracy was ±2 g. It would be possible to reduce the weighing time if the capacity of the inverter motor were increased. FIG. 10 shows the weighing results for 5 kg of powder B and makes clear that the flow was at the maximum rotational speed and that if the flow rate were improved, the time would be even shorter.

Since a load cell of an accuracy of 1/2500 was used in this test, with a 50 g weighing, there is an accuracy of ±2 g, which is the equivalent of the static accuracy of the load cell. It is, therefore, evident that if a load cell with an accuracy of 1/5000 were used an accuracy of ±1.0% can be obtained in a weighing range of 1:100. Moreover, an inverter motor was used in this test, and the range of its rotational speed (the ratio of the minimum speed and the maximum speed) was 1:10. If this motor were replaced with a servo motor, the range of the rotational speed will be widened and higher accuracy weighings will be possible in the same weighing time in a 1:100 weighing range.

TABLE 1

| Target weight | Powder A, n = 3 | | Powder B, n = 3 | |
|---|---|---|---|---|
| | Error | Weighing time | Error | Weighing time |
| 5 kg | ±2 g | 116 sec | ±2 g | 145 sec |
| 1 kg | ±2 g | 32 | ±2 g | 48 |
| 500 g | ±2 g | 28 | ±1 g | 38 |
| 100 g | ±2 g | 39 | ±0 g | 54 |
| 50 g | ±2 g | 27 | ±2 g | 30 |

The following effects can be obtained with the same membership functions and fuzzy rules without relying on the flow characteristics of the flow regulator or the construction of the weighing system. etc., using a powder weighing of this invention as described above.

(1) High accuracy weighings can be effected regardless of changes in the speed of flow due to disturbances and variations in the physical properties of the powder.

(2) A wide range of weighings can be effected with a wide range of target weight settings.

(3) Short duration weighings which do not rely on the size of the target weights can be effected.

Furthermore, weighing control equipment can be easily produced using a low capacity memory and equipment can be reduced.

Two embodiments of the weighing mixer with multiple supply containers and a fixed receiving container will now be explained.

Figure 11:
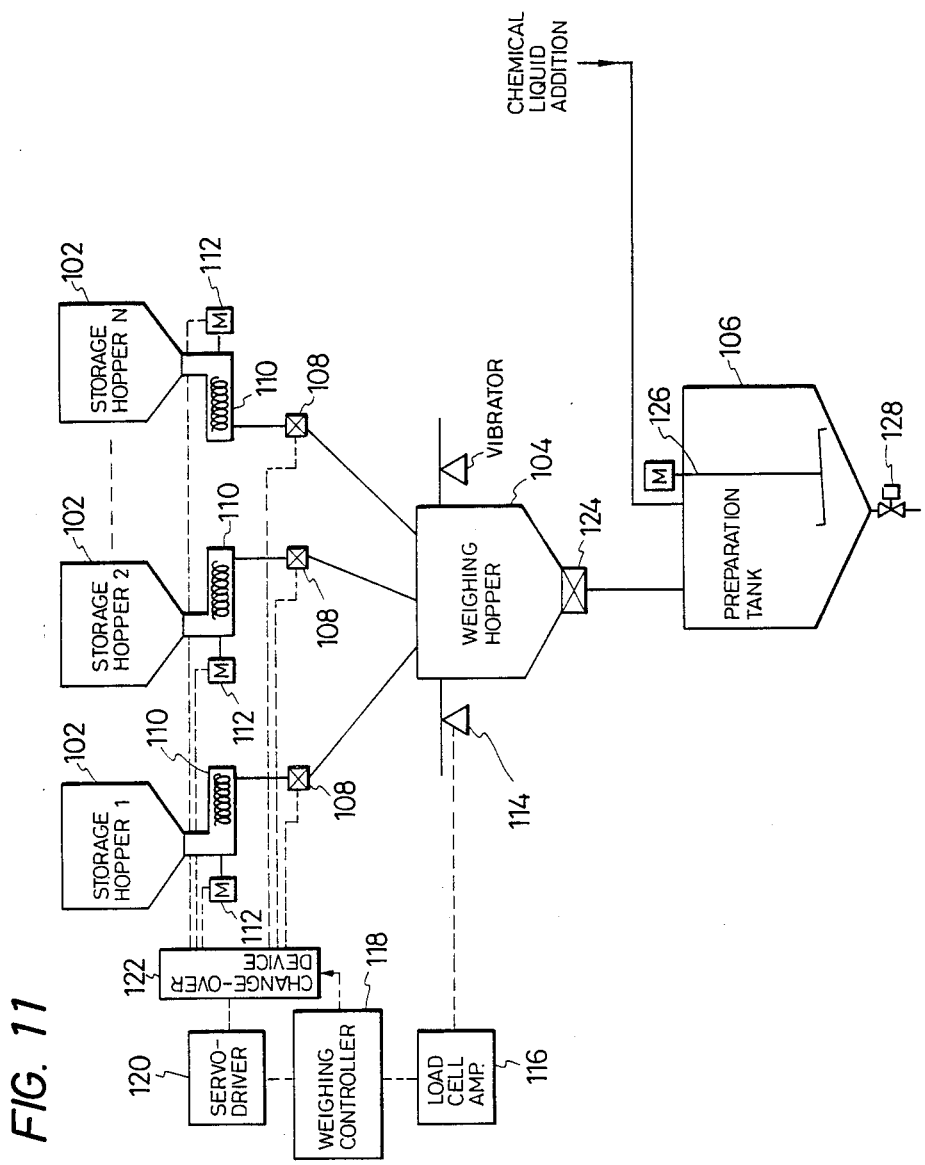
FIG. 11 is a structural figure of one embodiment of a weighing mixer for various kinds of powders.

The first embodiment, illustrated in FIG. 11, is a weighing mixer for N types of powder. That is, this embodiment produces mixed powders by stocking raw materials into N storage hoppers 102 positioned as supply containers at the head of flow, supplying powder into a single weighing hopper 104 positioned as a receiving container downstream from the supply hoppers 102 and, after cumulatively weighing the weights of the N types of powders in the weighing hopper 104, transfers them into a preparation tank 106.

The outlets of the N storage hoppers 102 are connected with N shutter gates 108 via N screw feeders 110 driven by N servo motors 112. The outputs from these gates 108 are led through piping or ductwork with a construction such that no powder is left in the piping but all travels into the weighing hopper 104.

The screw feeders 110 have a variable rotation count rate and so are able to vary the powder transmission speeds over a wide range.

The weighing hopper 104 is positioned on a load cell 114 which is the detector, in order to measure the weight of powder transferred from each of the storage hoppers 102. The load cell 114 is connected through a load cell amplifier 116 to a weighing controller 118. The weighing controller 118 is connected via a servo driver 120 to a change-over device 122.

The change-over device 122 changes its input to different outputs in accordance with commands from the weighing controller 118 to select one of the several powder supply systems. It transmits the rotation drive command and the aperture position command from the weighing controller 118 to the selected servo motor 112 and shutter gate 108.

Furthermore, the weighing hopper 104 has pipes leading through a discharge gate 124 into the preparation tank 106 and is further fitted with equipment such as a vibrator or air knocker to dispel powder left inside the weighing hopper 104. The preparation tank 106 is fitted with a stirring apparatus 126 and a bottom valve 128 at its outlet.

Figure 12:
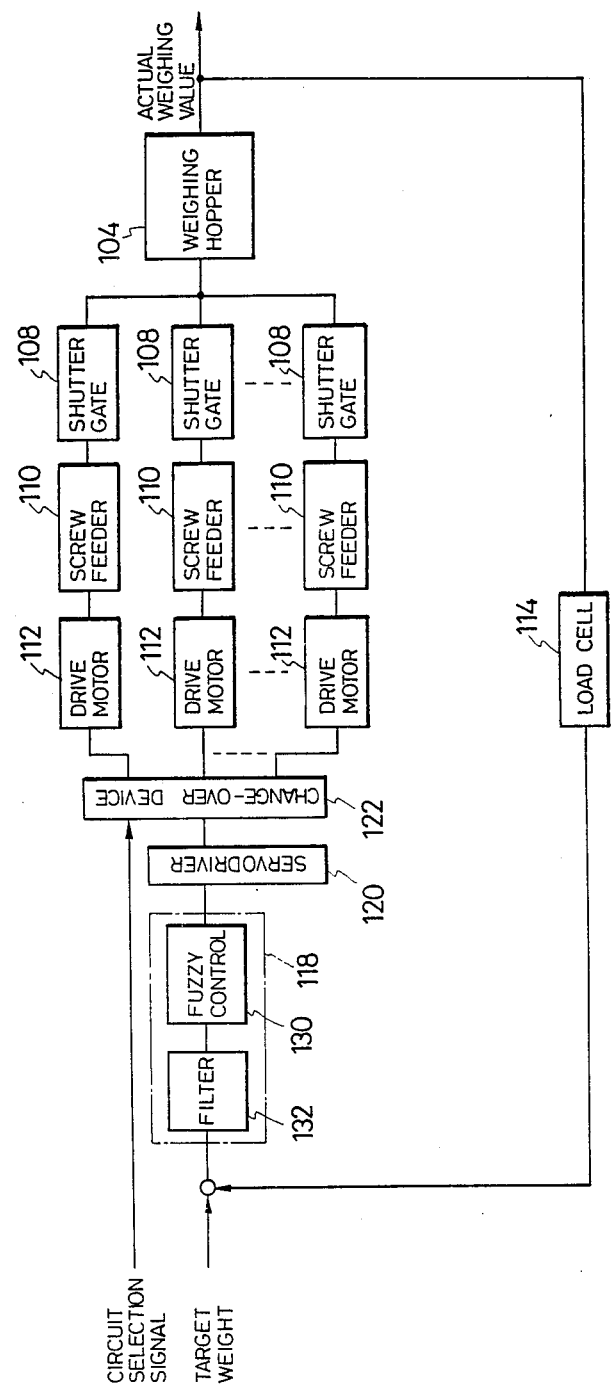
FIG. 12 is a control block diagram explaining the equipment of FIG. 11.

Next, a powder weighing mixing process usable in the above powder weighing mixer will be explained in conjunction with FIG. 12 which is a control block diagram.

First, the weighing and mixing criteria such as the specification of the storage hoppers to supply the stock powders for mixing and the weighing sequence of the storage hoppers involved are specified by the weighing controller 118.

A target weight is established by the weighing controller 118 and when the start of weighing for one of the powders is indicated, first of all, the supply system is selected by the change-over device. In this example, it is assumed that it is the first of the N supply systems which is selected so that the first shutter gate 108 opens. A rotation count command is transmitted to the servo driver 120 from the weighing controller 118 so that the first screw feeder 110 will transfer powder at a predetermined rotational count. The first servo motor 112 is set in drive and the screw feeder is rotated at the indicated rotational count so that the flow of raw material begins. At this time, the initial speed of rotation of the first screw feeder 110 is calculated by a fuzzy control part 130 of the weighing controller based on a fuzzy inference using the flow characteristics and the target weight of the selected screw feeder 110. Using this, the raw material in the first supply hopper 102 begins to be transferred to the weighing hopper 104. The load cell 114 of the weighing hopper 104 detects the weight of the raw material which has been transferred thereto and feeds the value back to the weighing controller 118 through the load cell amplifier 116.

In the weighing controller 118, a filter computing part 132 calculates the deviation between the target weight and the actual fed back measured weight and the change in this deviation over time and also calculates an apparent weight produced by a low pass filtering process performed on these weights.

The fuzzy control part 130 performs a fuzzy inference based on this apparent value of the weight, and calculates the rotational count for the selected screw feeder 110 in the next control cycle to change the speed of flow.

Figure 5:
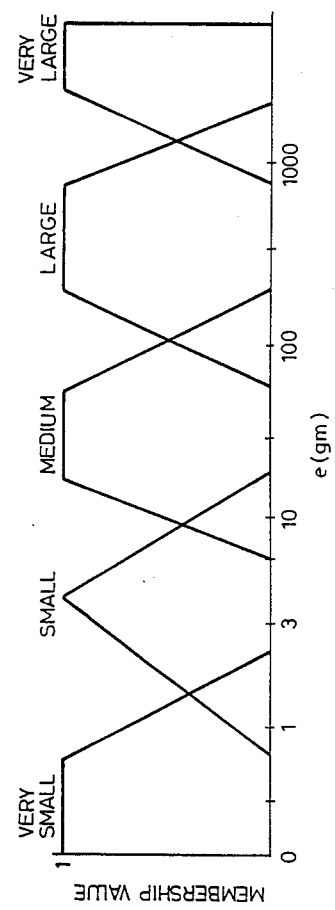
FIGS. 4, 5, 6 and 6A are diagrams explaining fuzzy control.

As illustrated in FIG. 5 the proportions of the horizontal axes of the membership function used for the fuzzy inference corresponding to the respective physical quantities of the deviation and the time variation of the deviation are divided, for example, in equal semilogarithmic intervals so that the intervals for small physical amounts are more detailed. This division allows both the improved weighing accuracy and shortened weighing times. When the amount of deviation is large, there is no need for fine controllability, while when the amount of deviation is small, there is a need to improve the control accuracy. This is also true for the low pass filtering process. When the amount of deviation etc. is small, the deviation output of the low pass filter is used, and weighing accuracy is improved by softening the movement characteristics of the weighing detector (load cell).

After the start of weighing, the screw feeder 110 is controlled to an appropriate speed of rotation. As the weighing deviation gradually lessens, the speed of rotation also gradually slows and the flow rate decreases. The weighing deviation and the time variation of the deviation time lessen. When the deviation falls below a certain value, the measurement stops, the shutter gates 108 closes, the rotational speed of the screw feeder 110 reaches zero and rotation stops. Then the flow rate and the amount of inflow are both very small. Accordingly, the amount of inflow after cessation of weighing is small and the weighing accuracy can be improved without relying on changes in the flow rate.

Because of the flow characteristics of the screw feeder 110, illustrated in FIG. 7, there is a dead-zone for flow below about 10% of the maximum rotation rate. For the fuzzy inference operation, this dead-zone is all considered as zero deviation. Thus, even when rotational irregularities in the screw feeder, mechanical play, etc. occur, their adverse influence is allowed for by the dead-zone and the fuzzy control system and high accuracy weighing is possible. Moreover, within the weighing range the operation of the screw feeder 110 changes owing to the target weight and the processing system and weighing can be carried out with one unit of weighing equipment regardless of the size of the target weight and the weighing range is expanded. However the static accuracy of the detector must be observed.

Furthermore, the shutter gate 108 can be activated even within the weighing time and almost equally short duration weighings are possible regardless of the size of the target weight.

Next, in the weighing and mixing process, there is a switch to weighing the powder in second supply hopper 102 selected in the same way. The change-over device 122 changes over to the second screw feeder 110 associated with the second supply hopper 102. The target weight is predetermined and weighing is performed using the same type of control as that described above following the weighing start indication. That is to say, the control function within the control equipment is the same except that the output signals to the second shutter gate 108 and the second screw feeder 110 (the operational devices) have been changed over by the change-over equipment 122.

Moreover, the flow characteristics of the second screw feeder 110 need not necessarily be the same as those of the previously first screw feeder 110. However, the characteristics are similar around the dead-zone. As a result of this, although the changes in speeds of transmission after the start of weighing are different, the speed of transmission immediately before the end of weighing is roughly the same and it is possible to weigh with the same membership functions and fuzzy rules. Accordingly, high accuracy, wide range, short duration weighing which does not rely upon differences in the system structure, the flow characteristics of a flow regulator, etc., can be achieved.

When cumulative weighing of the various types of powders has been completed in the weighing hopper 104, the discharge gate 124 in the weighing hopper 104 opens and the powders are introduced into the preparation tank 106. Moreover, when performing the discharge from the weighing hopper, the entire amount of powder is discharged by means of auxiliary equipment 134 such as a vibrator. As well as adding desired liquid chemicals, mixing is carried out with the stirring apparatus 126 being rotated in the preparation tank 106. With the completion of stirring, the bottom valve 128 opens and the mixed powders are discharged.

Next, results of a trial carried out on the basis of this invention are the same as those described with reference to FIGS. 7, 8 and 9.

In the embodiment described immediately above, a case was described in which cumulative weighings of N kinds of powder were performed in one weighing hopper. There were no limitation on the number of kinds of powder to be weighed and mixed. However, from the point of view of the system, the optimum number of screw feeders controlled by the same weighing equipment is approximately eight.

Figure 13:
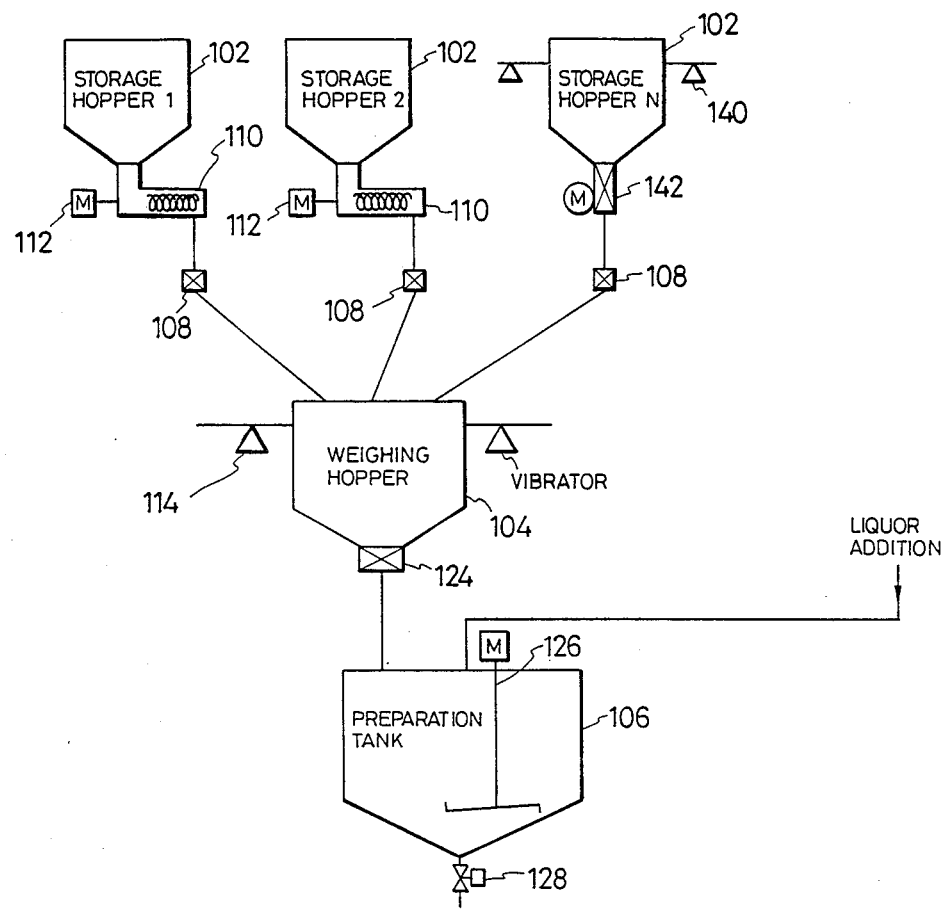
FIG. 13 is a structural figure of a weighing mixer according to an alternative example of this invention.

FIG. 13 shows an alternative example of this measuring mixer of the invention.

In this alternative example, a negative weighing system is combined with previously described positive weighing system. The negative system weighs the amount of powder flowing out of the supply hopper by providing a detector in the supply hopper.

Thus, first the (N−1) storage hoppers, the powder supply system and the weighing mixing system in this figure have the same construction as in the previous embodiment. Accordingly, their explanation is abbreviated by using the same reference numerals. In this example, the N-th storage hopper 102 has its weight measured by a load cell 140 associated therewith and the amount of powder flowing out of the N-th hopper 102 is thereby weighed. Furthermore an aperture damper 142 is attached at the outlet from the N-th supply hopper 102 and the amount of outflow is controlled by the variable aperture of the damper 142. Moreover, in the figure, although an aperture damper is shown as the operational point of the subtraction weighing, this flow rate control is also possible through other means, a screw feeder, for example.

Figure 14:
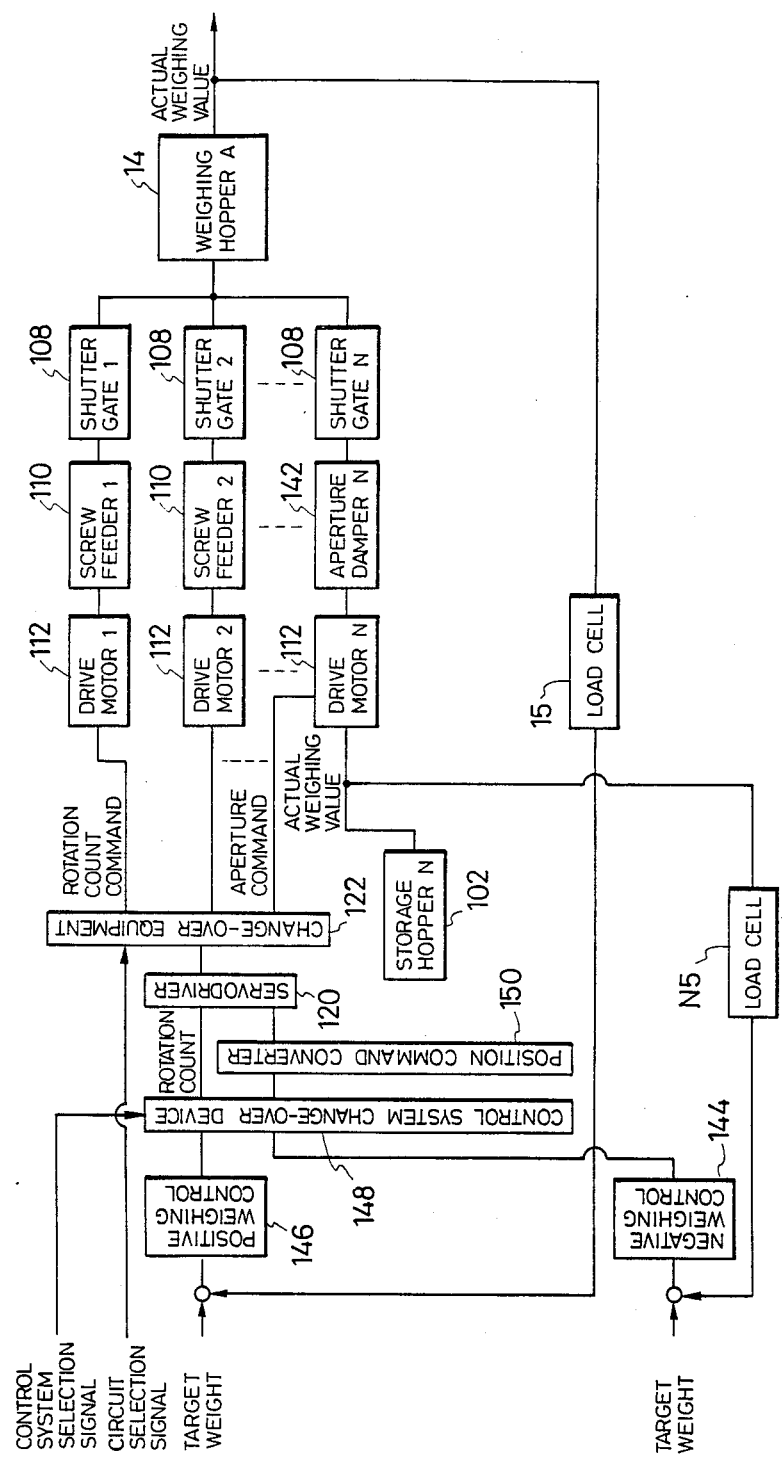
FIG. 14 is a control block diagram explaining the equipment in FIG. 13.
Figure 15:
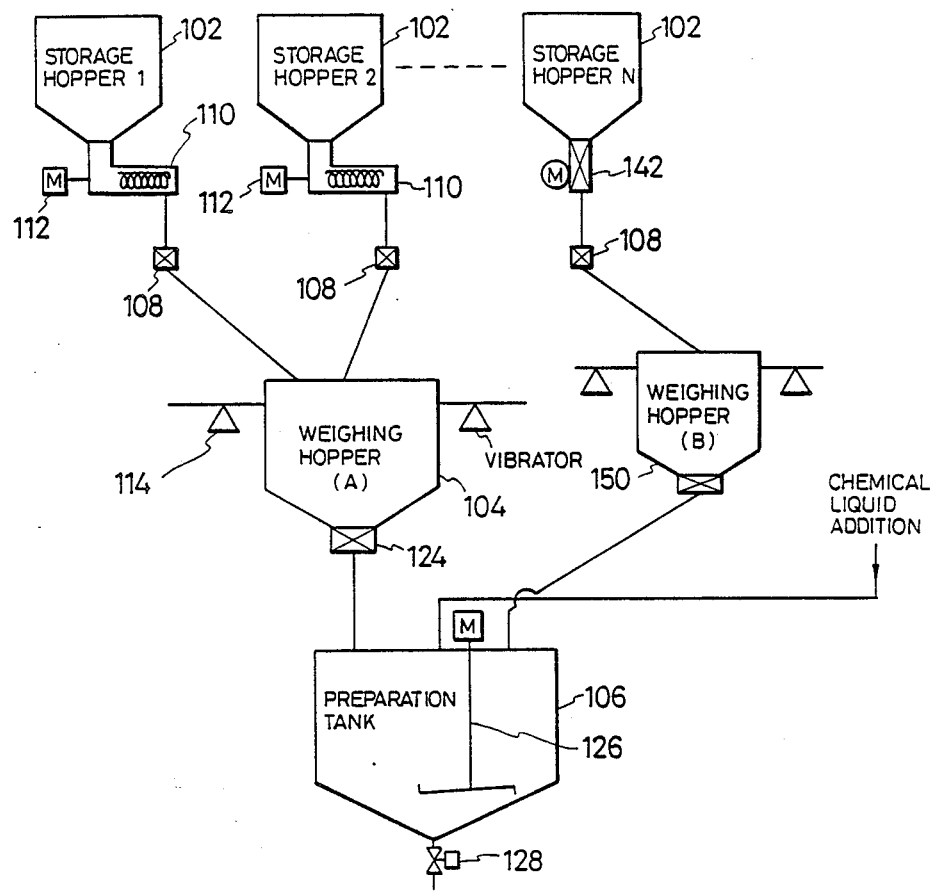
FIG. 15 illustrates a fixed powder weighing mixer with two weighing containers.

FIG. 14 shows a block diagram of the control of the above-mentioned alternative example. The amount of outflow of the powder which has been charged in the N-th storage hopper 102 is subtractively weighed by means of the load cell 140. Also, when the same powder is transferred to the weighing hopper 104, it is weighed cumulatively by means of the load cell 114 with the powders which have already been transferred from the first (N−1) storage hoppers 102. In this way, the actual weighing values obtained by the negative weighing system and the positive weighing system respectively are fed back to a corresponding negative system weighing controller 144 and a positive system weighing controller 146. The weighing controllers 144 and 146 calculate the deviation and the change in deviation over time with their respective set target weights. Both output control values by means of fuzzy control. These control values then pass through a control system change-over device 148. The value from the negative system is converted to a value showing the aperture of the aperture damper 142 by a position command converter 150 and they are transmitted together with the rotation count of the screw feeder obtained by the addition system to the servo driver 120, after being changed over and output by change-over device 122.

Using a construction such as that mentioned above, it is possible to perform weighings in an even wider weighing range by performing fine weighings by negative weighing and large target weight weighings by positive weighing.

It is also possible to provide a movable preparation tank as an alternative example of this invention. With such a construction, it is possible to simplify the distribution system and receive only the desired powders by moving the preparation tank to under the discharge gates corresponding to those of the various kinds of powders to be supplied to the preparation tank at the time of stirring or reaction, for example.

In the aforementioned embodiments, screw feeders were given as the flow controls which varied the speed of flow, however, they could be rotary-type, varying the flow with a rotation count, command in the same way as a screw feeder. Furthermore, if the powder has good flow characteristics, an aperture damper which alters the flow by varying the aperture with a positional command can also be employed.

As described above, with the powder weighing mixers of this invention, it is possible to:

(1) reduce the number of weighing units:

(2) reduce the loss of raw materials by making use of weighing equipment which is not governed by the target weight, the amount of powder remaining, the physical properties of the powder. Thus the following economic effects can be obtained:

(a) a reduction in the initial cost owing to the reduction in the number of units;

(b) a reduction in maintenance owing to the reduction in the number of units;

(c) a reduction in breakdowns owing to the improvement in reliability caused by the reduction in the number of units; and (d) a reduction in running costs owing to the reduction in the losses of raw material.

With a batch production process using a plurality of powders, there are many occasions when it is impossible to perform a cumulative weighing in one receiving hopper since the physical properties of the powders are different. Accordingly, a production system may be adopted which has a plurality of receiving or weighing hoppers 104 and 150, each equipped with weighing equipment, as shown in FIG. 4. Thereby the mixable kinds of powders are weighed in the first weighing hopper 104, and the non-mixable kinds of powders are weighed in the separate weighing hopper 150. The downstream preparation tank 106 is required for reacting and preparing the different sets of powders, thus complicating the system.

When several kinds of product are to be prepared in a production system where the preparation tank 106 is fixed, there will be a need to fit the equipment in accordance with the desired constituents of the products and, as outlined previously, there will be a need for a large number of weighing hoppers, preparation tanks and weighing equipment, control equipment, and valves to fit to them particularly for high accuracy weighings. In this instance, the equipment will be such that components will be used for some product types but not for others, which is a very wasteful system and one which increases the initial cost of components. Furthermore, there has recently been a need for a production system with many applications, but with a fixed production system. Modifications are needed to the piping system of this fixed system and to other attachments which would make for a very complicated production system.

A mobile batch production system in which the receiving containers, the preparation tank, etc. are able to move has, therefore, been recently proposed.

However, when such systems have been adopted in conventional weighing equipment, the weighing time differs depending on the size of the target weight. The weighing takes longer when the target weight is large, imposing a limit on the conveying time for the containers in a mobile production system. Thus, the requisite number of weighing equipment units are provided in conventional production systems so that no constraints are placed on the conveying time. However, this cancels out the benefit of a mobile production system. The length of stay at a station is also extended in such a system. Also, a very large number of weighing equipment units are required because of the range of the target weights, the limits on weighing time, weighing accuracy conditions, etc. For this reason, the operating time for piping connectors is increased.

In production processes for photographic materials, since these are light-sensitive materials which are being dealt with, there is a need to maintain light exclusion. Any complication of the system owing to an increase in connecting parts or change in the conveyance cycle will affect the product performance.

By providing moving equipment for the receiving hopper, it becomes possible to receive powders from all the powder supply hoppers because the weighing hopper is able to move. Flexibility in the components is also possible, reducing the number of weighing hoppers since the powder which has been weighed is distributed to all the preparation tank without any fixed piping. Accordingly, it is possible to avoid idleness in the components of the weighing hoppers when producing many kinds of products. Changes in the method of treatment can be undertaken with an extremely reduced increase in equipment. Furthermore, variations in time can be kept small with small scale manufacture since the weighing cycle can be made quicker by means of the movement of the weighing hopper. A stirring apparatus can be attached to the weighing hopper for the powder from the powder supply hoppers and it can be used itself as a preparation tank.

A movable embodiment of this invention will be described now in more detail.

Figure 16:
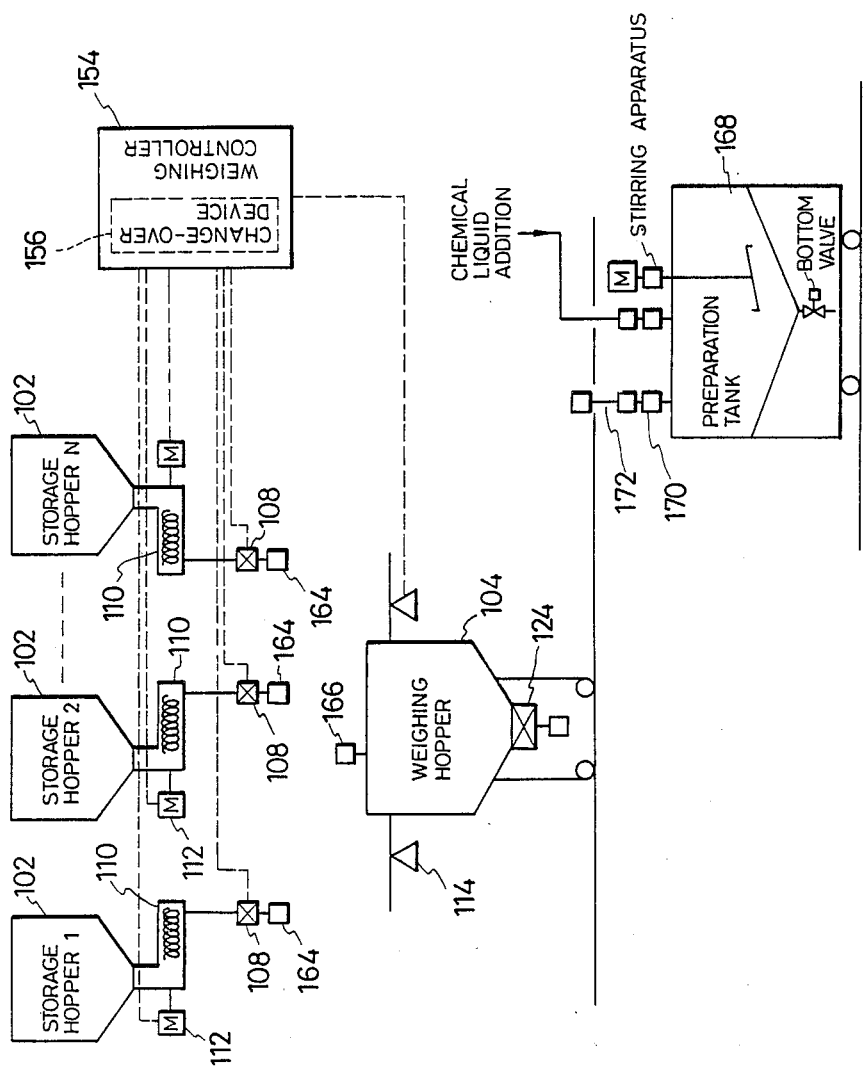
FIG. 16 is a flow sheet of one example of a movable powder weighing mixer of this invention.

Considering an instance in which there are N powder substances, as shown in FIG. 16, it is assumed that a plurality of product types will be produced, but that with any product type the overall number of substances used will be less than N. In conventional production systems, the weighing equipment and the powder supply hopper for the substance will be required for the sole use of the product type because of the restraints of the weighing range, weighing time and weighing accuracy even when the equipment is of the same type. This multiplicity is required irrespective of whether the system is moving or fixed and more than N units of equipment are used. However, in the present invention, since closed loop weighing control equipment for variable flow speed is adopted and the weighing control equipment utilizes fuzzy control, the weighing range, weighing time and weighing accuracy need cause ho concern. N units of powder supply hoppers are sufficient and a very small number of weighing units determined by the conveying capacity are sufficient. provided there are no problems of powder contamination.

Here, one unit of weighing equipment 114 (load cell) is assumed. A number N of powder supply hoppers 102 is sufficient, but since the number of weighing units 114 is determined by the production time, the production scale of the product type, there will be occasions when a number of weighing units greater than this will be required.

Figure 17:
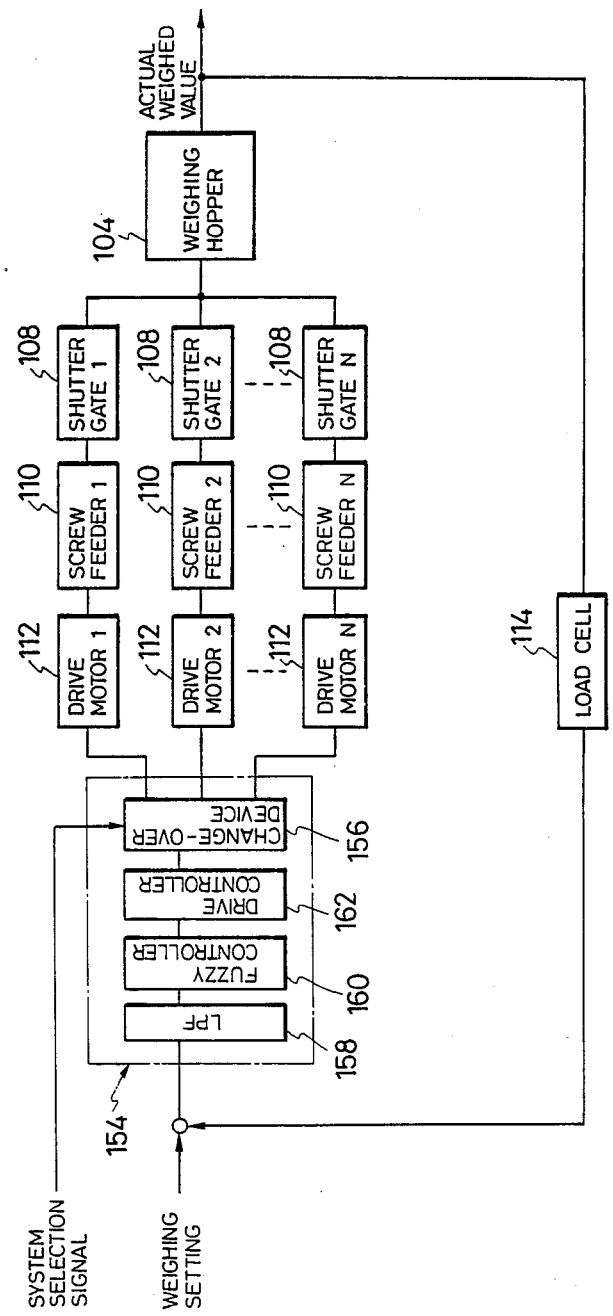
FIG. 17 is a block diagram of the closed loop control for this invention.

Each unit of weighing equipment possesses a weighing controller 154 capable of implementing the control diagram shown in FIG. 17. The output from the weighing controller 154 is selected and output to a plurality of flow regulators, for instance the N screw feeders 110, by switching performed in a change-over device 156. This is to say, the weighing of a plurality of substances (1 to N) is carried out in the same weighing hopper 104 equipped with the load cell 114 using the same control algorithm.

Since the rotational count of the screw feeders 110 is variable, the powder flow speed can vary over a wide range.

The weighing controller 154 is constructed from a low pass filter section 158, a fuzzy controller 160, a drive controller 162 and the change-over device 156. As far as the flow characteristics of the N screw feeders 110 are concerned, fuzzy control is carried out based on the target weight and the weighing value obtained from the load cell 114. The rotational count of the N screw feeders N is thereby controlled.

Moreover, when aperture dampers are used for the flow regulators, the angle of the damper is controlled by a positional command.

The operational process of the powder weighing mixer of the invention is now described.

An indication is sent out from the host production control equipment to the free-standing movable type weighing hopper 104 to move the weighing hopper 104 beneath a desired powder storage hopper 102. The change-over device 156 is changed over by means of a system selection signal and the screw feeder 110 of the selected storage hopper 102. The first stop valve or shutter gate 108 so selected can be controlled by means of the weighing controller 154.

Furthermore, an indication is sent out from the host production control equipment so that a coupler 164 corresponding to the first powder supply hopper 102 connects with a matching coupler 166 of the weighing hopper 104. When the weighing preparation state has been confirmed, the weighing start indication is sent out from the host via this sort of initial setting. By means of the weighing start command, the supply system first selected by the change-over device 156, in this instance the first powder supply system, is selected, the first shutter gate 108 opens, the associated drive motor 112 is driven and rotates in such a way that the first screw feeder 110 transfers powder at a predetermined rotational count using the rotational command from the drive controller 162 of the weighing controller 156, to thereby start the flow of the source material. At this time, the rotational count of the first screw feeder 110 is calculated by the fuzzy controller 160 using the target weight and the flow characteristics of the screw feeder 110. Thus, the raw material in the first storage hopper 102 start to be transferred to the weighing hopper 104. The weighing load cell of the weighing hopper 104 detects the weight of the raw material transmitted and feeds the value back to the weighing controller 154.

The filter section 158 of the weighing controller 154 carries out an operation on the deviation from the target weight on the time rate of change of deviation from the supply powder weighing values which have been fed back. It calculates a value in which a low pass filter operation has been carried out on these amounts. The aforementioned fuzzy controller 160 performs an inference operation based on fuzzy rules on the basis of this calculated value and it calculates the revolution count for the screw feeder 110 to take on an appropriate flow rate in the next control cycle.

After this start of weighing, the screw feeder 110 reduces its rotational count as the weighing deviation grows smaller until it takes on a very small flow rate.

Figure 18:
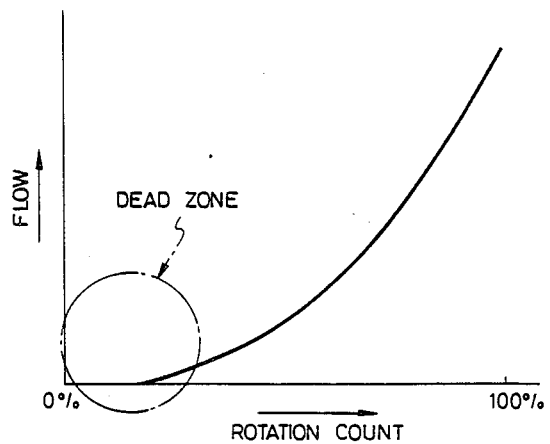
FIG. 18 is a flow characteristic for a flow regulator.

The weighing deviation and the time rate of change thereof grow less. When the weighing deviation falls below a certain value, the first shutter gate 108 moves to fully closed. At this time, the flow speed is very small and the amount of inflow is very small. As a result, the amount of inflow after the cessation of weighing is small and the weighing accuracy improves without relying on changes in the flow speed. Furthermore, as a result of possessing the general flow characteristics shown in FIG. 18, the screw feeder 110 has a dead-zone in the lower 10% of its allowed rotational rate range. This dead-zone is treated as zero in the fuzzy inference operation. Thus, even if there are rotational irregularities in the screw feeder or mechanical play, the adverse influence of play is absorbed by means of this dead-zone. Thereby, fuzzy control and high accuracy weighing become possible. Furthermore, the action of the flow regulator will vary as a result of the target weights and the process system and weighings with the same weighing equipment are possible regardless of the size of the target weight. Also, the weighing range is expanded. Again, the action pattern of the aforementioned flow regulator varies during the weighing time, and almost equally short duration weighings are possible regardless of the size of the target weight. The operation of the form mentioned above is put into effect in accordance with the constituents of the product type. When all the desired substances for a product type are weighed, the process shifts to an operation which transfers the powder to a preparation tank for a process downstream.

This preparation tank 168 also moves and connects its coupler 170 to the lower part of a piping link coupler 172. After the connection has been confirmed, the bottom valve 124 of the weighing hopper 104 is controlled by the conveying control equipment and opens and the powder is transferred through the piping link coupler 172 to the preparation tank 168.

In FIG. 16, the load cell 114 is positioned at the weighing hopper 104. Also, the moving equipment of the weighing hopper 104 is of a free-standing/running type, and may be a form which weighs at a desired position and is conveyed with the unmanned carriage. Moreover, electrically based linking equipment such as position sensors, etc., in every connecting position are necessary as attachments.

When a rotation blade is attached to the weighing hopper 104 and it is made to assume a mixing function and is positioned as a preparation tank, the system becomes all the more effective.

In the previously mentioned embodiment, a load cell 114 was given as an example of the weighing equipment, but there is no difference if another tank weighing detector is used.

The moving device may be an unmanned carriage which lifts the weighing hopper 104 for transport between stations or may be wheels attached to the weighing hopper 104.

By using the powder weighing mixer of this invention, a powder weighing mixer cumulatively weighs powders from a plurality of powder supply hoppers, receives them in a receiving hopper and mixes them. Weighing control equipment is fitted with a change-over device and operates with closed loop control in which supply powder the weighing control equipment varies the flow through various flow regulators by means of fuzzy inference based on various supply powder target weights. The powder supply hoppers each possess the flow regulators in series with powder supply piping. The weighing equipment for the powder supplied from the powder supply hoppers is positioned beside the receiving hopper. The invention is further characterized in that is possesses moving equipment for the receiving container. In a system which uses the control equipment of this invention short duration and fast weighing times are possible even over a wide range of weights. Accurate weighings can be effected without being influenced by changes in the flow rate due to disturbances and variation in the physical properties of the powders, even with large scale components. The production capacity increases with simplification of the components and a reduction in the number of units of weighing equipment. It is possible to effect reductions in raw material losses and improvements in production quality by means of large scale preparation. Thus, initial costs, maintenance costs and running costs can be reduced and reliability increased.

What is claimed is:

1. A powder weighing method, comprising the steps of:

setting a target weight of a powder to be measured;

regulating a flow rate of said powder supplied from a supply container to a receiving container through a flow regulator;

measuring a weight of said powder supplied to said receiving container;

determining a deviation between said measured weight and said target weight;

determining a time variation of said deviation;

performing a fuzzy inference upon said deviation and said time variation to produce a desired flow rate of said powder in a next control cycle; and in said next control cycle, again regulating said flow rate in response to said desired flow rate and repeating said measuring step, said two determining steps and said performing step;

wherein said flow regulator has a dead-zone in which a finite voltage signal supplied to said regulator produces a substantially zero flow rate and wherein in said performed fuzzy inference said dead-zone is associated with a zero flow rate.

2. A powder weighing method comprising the steps of:

setting a target weight of a powder to be measured;

regulating a flow rate of said powder supplied from a supply container to a receiving container through a flow regulator;

measuring a weight of said powder supplied to said receiving container;

subjecting said measured weight to low pass filtering;

determining a deviation between said low pass filtered measured weight and said target weight;

determining a time variation of said deviation;

performing a fuzzy inference upon said deviation and said time variation to produce a desired flow rate in a next control cycle; and in said next control cycle, again regulating said flow rate in response to said desired flow rate and repeating said measuring step said two determining steps and said performing step.

3. A powder weighing method, comprising the steps of:

setting a target weight of a powder to be measured;

regulating a flow rate of said powder supplied from a supply container to a receiving container through a flow regulator;

measuring a weight of said powder supplied to said receiving container;

determining a deviation between said measured weight and said target weight;

determining a time variation of said deviation;

performing a fuzzy inference upon said deviation and said time variation to produce a desired flow rate in a next control cycle, wherein membership functions of said deviation and said time variation used in said fuzzy inference are divided into groups having smaller intervals for smaller values of said deviation and said time variations; and in said next control cycle, again regulating said flow rate in response to said desired flow rate and repeating said measuring step said two determining steps and said performing step.

4. A powder weighing method as recited in claim 3, wherein at least some of said intervals for each of said membership functions have equal intervals on a logarithmic scale.

5. A powder weighing method comprising the steps of:

setting a target weight of a powder to be measured;

regulating a flow rate of said powder supplied from a supply container to a receiving container through a flow regulator;

measuring a weight of said powder supplied to said receiving container;

determining a deviation between said measured weight and said target weight;

determining a time variation of said deviation;

performing a fuzzy inference upon said deviation and said time variation to produce a desired flow rate in a next control cycle; and in said next control cycle, again regulating said flow rate in response to said desired flow rate and repeating said measuring step, said two determining steps and said performing step;

wherein an initially regulated flow rate through said flow regulator is determined by fuzzy inference based on flow characteristics of said flow regulator and said target weight, a membership function of said target weight having a multi-step form in dependence on a value of said target weight.

6. A measuring mixer for powders, comprising:

a plurality of supply containers;

a plurality of flow regulators attached to respective outputs of said supply containers;

a plurality of supply pipes attached to respective outputs of said flow regulators;

a movable receiving container movable between said plurality of supply pipes for receiving therefrom powders passed through said plurality of flow regulators;

measuring means for measuring an amount of powder received by said receiving container from any of said supply pipes;

determining means for determining a deviation between said measured amount and a target amount and a time variation of said deviation;

control means operating according to fuzzy inference upon said deviation and said time variation to produce a desired flow rate in a next control cycle of said control means; and switching means for switching an output of said control means to a selected one of said flow regulators.

* * * * *